(12) United States Patent
Li et al.

(10) Patent No.: US 11,865,932 B2
(45) Date of Patent: Jan. 9, 2024

(54) HIGH VOLTAGE SWITCHING FOR AN ELECTRIC VEHICLE

(71) Applicant: GM Global Technology Operations LLC, Detroit, MI (US)

(72) Inventors: Dongxu Li, Troy, MI (US); Lei Hao, Troy, MI (US); Chunhao J. Lee, Troy, MI (US); Suresh Gopalakrishnan, Troy, MI (US); Junfeng Zhao, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 14 days.

(21) Appl. No.: 17/839,736

(22) Filed: Jun. 14, 2022

(65) Prior Publication Data

US 2023/0398887 A1 Dec. 14, 2023

(51) Int. Cl.
*B60L 53/20* (2019.01)
*B60L 1/02* (2006.01)
*H02M 3/155* (2006.01)

(52) U.S. Cl.
CPC .......... *B60L 53/20* (2019.02); *B60L 1/02* (2013.01); *H02M 3/155* (2013.01); *B60L 2210/10* (2013.01)

(58) Field of Classification Search
CPC ........ B60L 53/20; B60L 1/02; B60L 2210/10; H02M 3/155
See application file for complete search history.

(56) References Cited

U.S. PATENT DOCUMENTS

| 11,616,368 B2 * | 3/2023 | Lee | H02J 7/00712 |
| | | | 320/140 |
| 2023/0084872 A1 * | 3/2023 | Beig | B60L 50/70 |

FOREIGN PATENT DOCUMENTS

| CN | 108075554 A | * | 5/2018 | ............. B60L 1/00 |
| CN | 108075555 A | * | 5/2018 | ............. B60L 58/10 |
| DE | 102015007585 A1 | * | 12/2016 | ........... B60L 3/0046 |
| DE | 102017116585 A1 | * | 2/2018 | ............. B60L 11/02 |
| DE | 102019125068 A1 | * | 3/2021 | ........... B60R 16/033 |
| EP | 2821309 A2 | * | 1/2015 | ............. B60R 16/03 |
| GB | 2536063 A | * | 9/2016 | ............. B60L 50/10 |
| JP | 2015009742 A | * | 1/2015 | ............. B60L 58/20 |
| JP | 2016136832 A | * | 7/2016 | ............. B60L 1/003 |
| KR | 20190114483 A | * | 10/2019 | |
| WO | WO-2022231737 A1 | * | 11/2022 | ............. B60L 53/30 |

* cited by examiner

*Primary Examiner* — Adam D Houston
(74) *Attorney, Agent, or Firm* — CANTOR COLBURN LLP

(57) ABSTRACT

Examples described herein provide a method that includes determining whether a vehicle is operating in a first high voltage mode or a second high voltage mode. The method further includes, responsive to determining that the vehicle is operating in the first high voltage mode, providing electric power to an electric motor at a first high voltage and providing electric power to an auxiliary device at a second high voltage that is different than the first high voltage. The method further includes, responsive to determining that the vehicle is operating in the second high voltage mode, providing electric power to the electric motor at the second high voltage and providing electric power to the auxiliary device at the second high voltage.

20 Claims, 9 Drawing Sheets

HIGH VOLTAGE SWITCHING FOR AN ELECTRIC VEHICLE

INTRODUCTION

The present disclosure relates to vehicles and particularly to high voltage switching for an electric vehicle.

Modern vehicles (e.g., a car, a motorcycle, a boat, or any other type of automobile) may be equipped with one or more electric motors, such as to drive a wheel(s) of the vehicle. For example, an electric motor can be mechanically coupled to a wheel of a vehicle to apply rotational force to the wheel, creating a driveline. In some examples, a vehicle can include multiple electric motors. The electric motor(s) receives electric power from a rechargeable energy storage system (RESS), which can include one or more batteries for storing electric power. The RESS can also provide electric power to other systems of the vehicle (e.g., climate control systems, infotainment systems, etc.).

SUMMARY

In one exemplary embodiment, a method is provided. The method includes determining whether a vehicle is operating in a first high voltage mode or a second high voltage mode. The method further includes, responsive to determining that the vehicle is operating in the first high voltage mode, providing electric power to an electric motor at a first high voltage and providing electric power to an auxiliary device at a second high voltage that is different than the first high voltage. The method further includes, responsive to determining that the vehicle is operating in the second high voltage mode, providing electric power to the electric motor at the second high voltage and providing electric power to the auxiliary device at the second high voltage.

In additional examples, providing electric power to the auxiliary device at the second high voltage includes engaging a direct current to direct current (DC-DC) converter.

In additional examples, engaging the DC-DC converter includes closing a first relay at an input of the DC-DC converter.

In additional examples, providing electric power to the auxiliary device at the second high voltage includes disengaging the DC-DC converter and engaging a DC-DC converter bypass.

In additional examples, disengaging the DC-DC converter includes opening a first relay at an input of the DC-DC converter and closing a second relay associated with the DC-DC converter bypass.

In additional examples, the electric power is provided by a rechargeable energy storage system disposed within the vehicle.

In additional examples, the first high voltage is substantially 800 volts and wherein the second high voltage is substantially 400 volts.

In another exemplary embodiment a vehicle is provided. The vehicle includes an electronic motor, an auxiliary device, and a controller. The controller determines whether the vehicle is operating in a first high voltage mode or a second high voltage mode. The controller further, responsive to determining that the vehicle is operating in the first high voltage mode, cause electric power to be provided to the electric motor at a first high voltage and cause electric power to be provided to the auxiliary device at a second high voltage that is different than the first high voltage. The controller further, responsive to determining that the vehicle is operating in the second high voltage mode, cause electric power to be provided to the electric motor at the second high voltage and cause electric power to be provided to the auxiliary device at the second high voltage.

In additional examples, causing electric power to be provided to the auxiliary device at the second high voltage includes causing a direct current to direct current (DC-DC) converter to be engaged.

In additional examples, causing the DC-DC converter to be engaged includes causing a first relay at an input of the DC-DC converter to be closed.

In additional examples, causing electric power to be provided to the auxiliary device at the second high voltage includes causing the DC-DC converter to be disengaged and causing a DC-DC converter bypass to be engaged.

In additional examples, causing the DC-DC converter to be disengaged includes causing a first relay at an input of the DC-DC converter to be opened and causing a second relay associated with the DC-DC converter bypass to be closed.

In additional examples, the electric power is provided by a rechargeable energy storage system disposed within the vehicle.

In additional examples, the first high voltage is substantially 800 volts and wherein the second high voltage is substantially 400 volts.

In yet another exemplary embodiment a system is provided. The vehicle includes a memory comprising computer readable instructions and a processing device for executing the computer readable instructions. The computer readable instructions control the processing device to perform operations. The operations include determining whether a vehicle is operating in a first high voltage mode or a second high voltage mode. The operations further include, responsive to determining that the vehicle is operating in the first high voltage mode, causing electric power to be provided to an electric motor at a first high voltage and causing electric power to be provided to an auxiliary device at a second high voltage that is different than the first high voltage. The operations further include, responsive to determining that the vehicle is operating in the second high voltage mode, causing electric power to be provided to the electric motor at the second high voltage and causing electric power to be provided to the auxiliary device at the second high voltage.

In additional examples, causing electric power to be provided to the auxiliary device at the second high voltage comprises causing a direct current to direct current (DC-DC) converter to be engaged.

In additional examples, causing the DC-DC converter to be engaged includes causing a first relay at an input of the DC-DC converter to be closed.

In additional examples, causing electric power to be provided to the auxiliary device at the second high voltage includes causing the DC-DC converter to be disengaged and causing a DC-DC converter bypass to be engaged.

In additional examples, causing the DC-DC converter to be engaged includes causing a first relay at an input of the DC-DC converter to be opened and causing a second relay associated with the DC-DC converter bypass to be closed.

In additional examples, the electric power is provided by a rechargeable energy storage system disposed within the vehicle.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
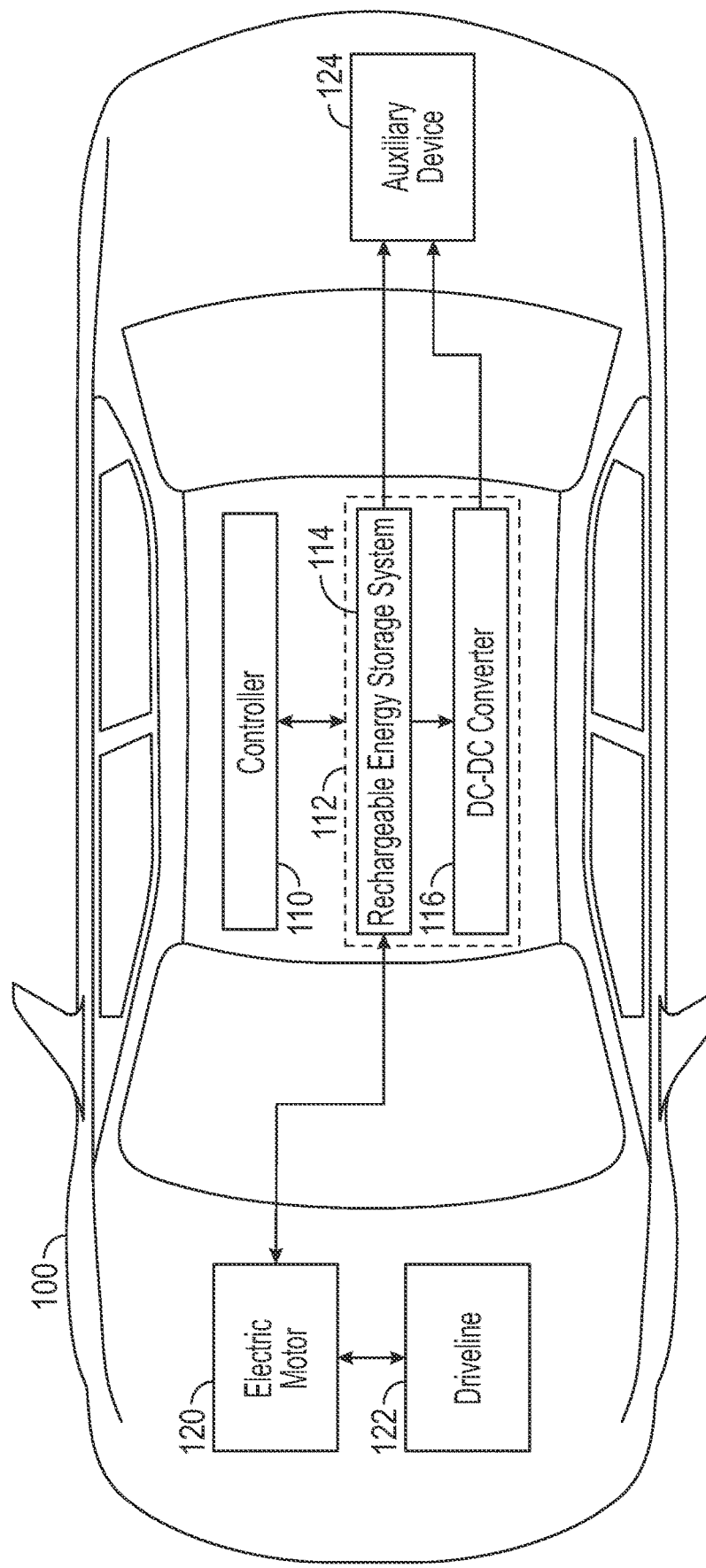
FIG. 1 is a block diagram of a vehicle that incorporates high voltage switching according to one or more embodiments described herein.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for high voltage switching for an electric vehicle. Some vehicles use fixed high voltage, such as to provide electric power to an electric motor and/or auxiliary devices. However, other vehicles use variable high voltages to provide electric power to the electric motor. Variable voltage provides flexibility that can enhance the drive system efficiency, such as when high performance is not needed. Auxiliary devices typically operate at a set voltage, and thus variable high voltages are not needed for these devices.

One or more embodiments described herein provide architectures and methods for providing high voltage switching for an electric vehicle. According to one or more embodiments described herein, a voltage switching RESS system (for charging) operates for propulsion to achieve higher efficiency. For example, when operating in a first mode (e.g., a "first high voltage mode"), a relatively higher high voltage can be applied to the electric motor while a relatively lower high voltage is applied to auxiliary devices. This provides for higher performance of the electric motor (e.g., more torque). In a second mode (e.g., a "second high voltage mode"), the same high voltage is applied to the electric motor and the auxiliary devices. This provides for improved efficiency of the electric motor (e.g., longer range).

FIG. 1 is a block diagram of a vehicle 100 that incorporates high voltage switching according to one or more embodiments described herein. The vehicle 100 may be a car, truck, van, bus, motorcycle, boat, plane, or another suitable vehicle. In the example of FIG. 1, the vehicle 100 includes a controller 110 to control a circuit 112 that includes a rechargeable energy storage system (RESS) 114 and a direct current (DC)-DC converter 116. The vehicle 100 further includes an electric motor 120 coupled to a driveline 122 and an auxiliary device 124. The auxiliary device 124 can include one or more devices that receive electric power other than the electric motor 120. Examples of auxiliary devices, such as the auxiliary device 124, include but are not limited to a climate control system such as a heater and/or air conditioning system, integrated power equipment, and/or the like, including combinations and/or multiples thereof.

The RESS 114 provides electric power to the electric motor 120 and the auxiliary device 124. As an example, the RESS 114 includes one or more batteries to receive, store, and supply electric power. The controller 110 controls aspects of the circuit 112 (e.g., one or more relays) to selectively provide the electric power from the RESS 114 to the electric motor 120 and the auxiliary device 124 where voltage of the electric power can vary. For example, in a first mode (e.g., a "first high voltage mode"), the RESS 114 provides the electric power to the electric motor 120 at a first high voltage (e.g., substantially 800 volts) and provides the electric power to the auxiliary device 124 at a second high voltage (e.g., substantially 400 volts) via the DC-DC converter 116. In a second mode (e.g., a "second high voltage mode"), the RESS 114 provides the electric power to the electric motor 120 and the auxiliary device 124 at the second high voltage (e.g., substantially 400 volts).

Although not shown, the controller 110 can include a processor (e.g., a central processing unit, a graphics processing unit, a microprocessor, etc.), a memory (e.g., a random-access memory, a read-only memory, etc.), a data store (e.g., a solid state drive, a hard disk drive, etc.), and/or the like, including combinations and/or multiples thereof. According to one or more embodiments described herein, the features and functions described herein regarding performing high voltage switching can be implemented by the controller 110, such as by being implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., the processors 621 of FIG. 6) for executing those instructions. Thus a system memory (e.g., the RAM 624 of FIG. 6) can store program instructions that when executed by the processing device implement the engines described herein. The features and functionality of the controller 110 are described further herein.

Figure 2:
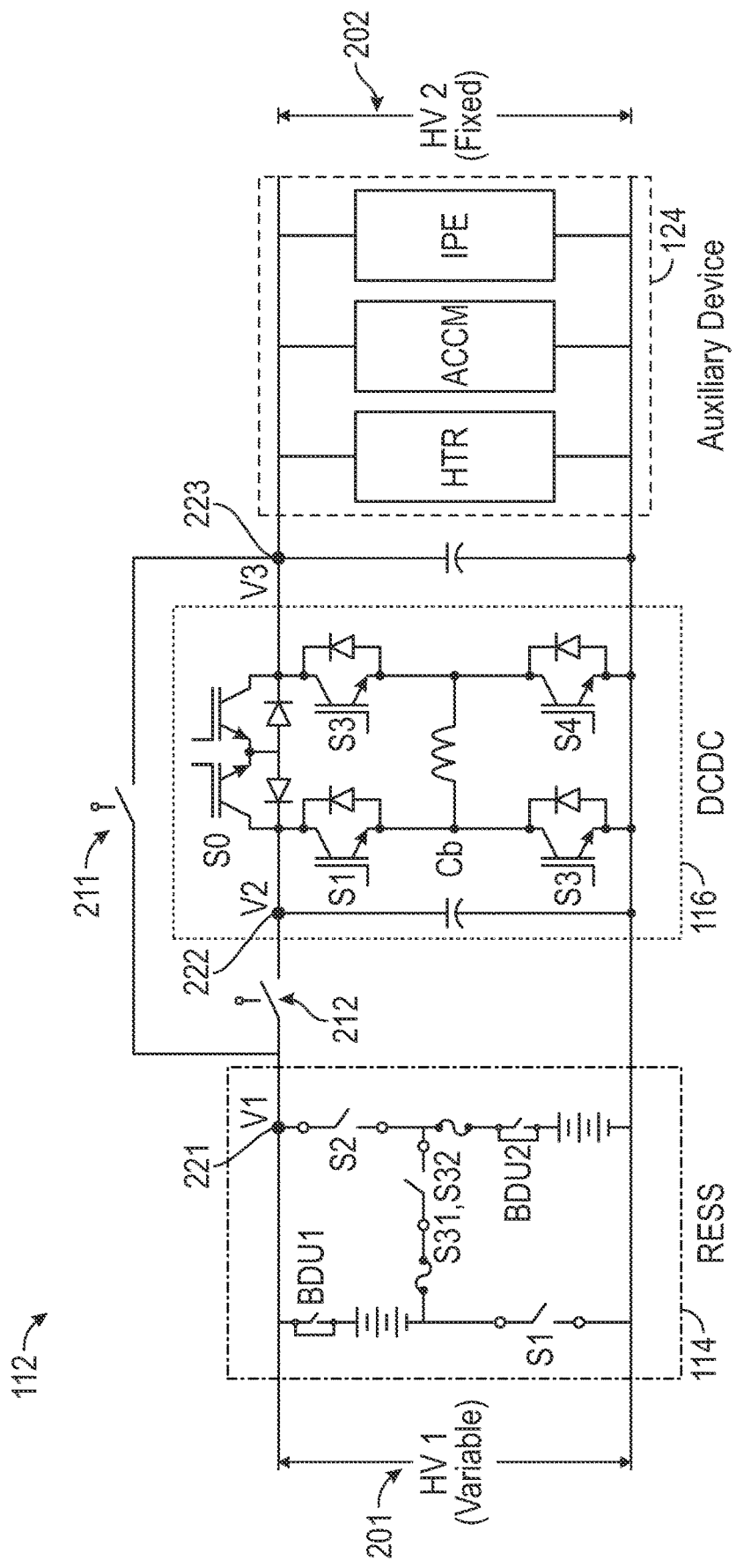
FIG. 2 is a circuit diagram of a circuit for high voltage switching for an electric vehicle according to one or more embodiments described herein.

FIG. 2 is a circuit diagram of the circuit 112 of FIG. 1 for high voltage switching for an electric vehicle according to one or more embodiments described herein. The circuit 112 includes the RESS 114 and the DC-DC converter 116, both of which are electrically coupled to the auxiliary device 124.

A first high voltage (HV1) 201 occurs across an output of the RESS 114. The first high voltage 201 can vary depending on the operating mode of the circuit 112. For example, when the circuit 112 is operating in the first high voltage mode, the first high voltage 201 is a relatively higher high voltage (e.g., substantially 800 volts); when the circuit 112 is operating in the second high voltage mode, the first high voltage 201 is a relatively lower high voltage (e.g., substantially 400 volts). According to one or more embodiments described herein, the output of the RESS 114 is provided to the electric motor 120.

A second high voltage (HV2) 202 occurs across the auxiliary device 124 as shown. Many auxiliary devices operate at a fixed high voltage; thus it is desirable not to vary the second high voltage 202, in contrast to the first high voltage 201. Thus, the second high voltage 202 remains fixed (within some operational range/tolerance). Thus, whether the circuit 112 is operating in the first high voltage mode or the second high voltage mode, the second high voltage 202 remains, such as at the relatively lower high voltage (e.g., substantially 400 volts).

The circuit 112 includes relays 211, 212 as shown, which change states between opened (i.e., no electric power flows through the relay) and closed (i.e., electric power flows through the relay). When the circuit 112 is operating in the first high voltage mode, the relay 212 is closed and the relay 211 is opened. This causes electric power to flow from the RESS 114 to the auxiliary device 124 via the DC-DC converter 116 as shown. The DC-DC converter 116 converts the electric power from the first high voltage 201 to the (relatively lower) second high voltage 202. For example, when the circuit 112 is operating in the first high voltage mode, if the first high voltage 201 is substantially 800 volts (e.g., measured at nodes 221, 222), the DC-DC converter 116 reduces the voltage to substantially 400 volts (e.g., measured at node 223); thus, the second high voltage 202 is reduced to substantially 400 volts.

However, when the circuit 112 is operating in the second high voltage mode, the relay 211 is closed and the relay 212 is opened. This creates a bypass via the relay 211, causing the electric power to flow from the RESS 114 to the auxiliary device 124 without passing through the DC-DC converter 116. For example, when the circuit 112 is operating in the second high voltage mode, if the first high voltage 201 is substantially 400 volts (e.g., measured at nodes 221, 222), electric power is passed to the auxiliary device 124 via the bypass created by the relay 211 being closed; accordingly, the resulting voltage (e.g., the second high voltage 202) across the auxiliary device 124 remains the same as the first high voltage 201 (e.g., substantially 400 volts).

It should be appreciated that although the circuit 112 is described using the example voltages of 400 volts and 800 volts, these represent only some of the many possible example voltages and are not intended to limit the scope of the claims.

Figure 3:
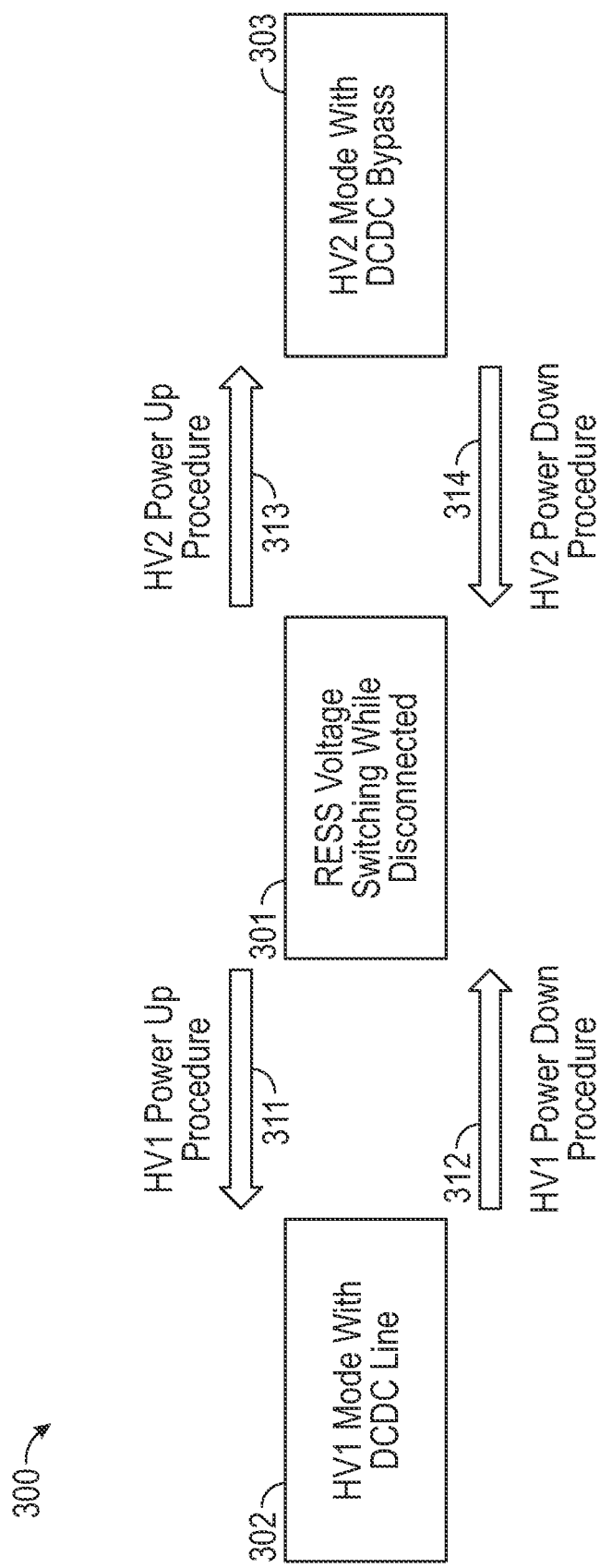
FIG. 3 is a block diagram of a system for high voltage switching for an electric vehicle according to one or more embodiments described herein.

FIG. 3 is a flow diagram of a method 300 for high voltage switching for an electric vehicle according to one or more embodiments described herein. At block 301, the RESS 114 is disconnected, and no electric power flows therefrom. If a first high voltage mode power up method 311 occurs, the method 300 advances to block 302 to activate a first high voltage mode where the relay 211 is open and the relay 212 is closed, thus activating the DC-DC converter 116 (see, e.g., FIG. 4A). Upon the occurrence of a switching event, a first high voltage power down method 312 can be performed (see, e.g., FIG. 4B). If a second high voltage mode power up method 313 occurs, the method 300 advances to block 303 to activate a second high voltage mode where the relay 212 is opened and the relay 211 is closed, thus providing for a bypass of the DC-DC converter 116 (see, e.g., FIG. 4C). Upon the occurrence of a switching event, a second high voltage power down method 314 can be performed (see, e.g., FIG. 4D).

FIGS. 4A-4D depict flow diagrams of methods 311, 312, 313, 314 according to one or more embodiments described herein. It should be appreciated that the methods 311, 312, 313, and/or 314 can be performed by any suitable system or device such as the controller 110 of FIG. 1, the processing system 600 of FIG. 6, or any other suitable processing system and/or processing device (e.g., a processor). The methods 311, 312, 313, 314 are now described with reference to one or more aspects of FIGS. 1 and 2 but is not so limited.

Figure 4A:
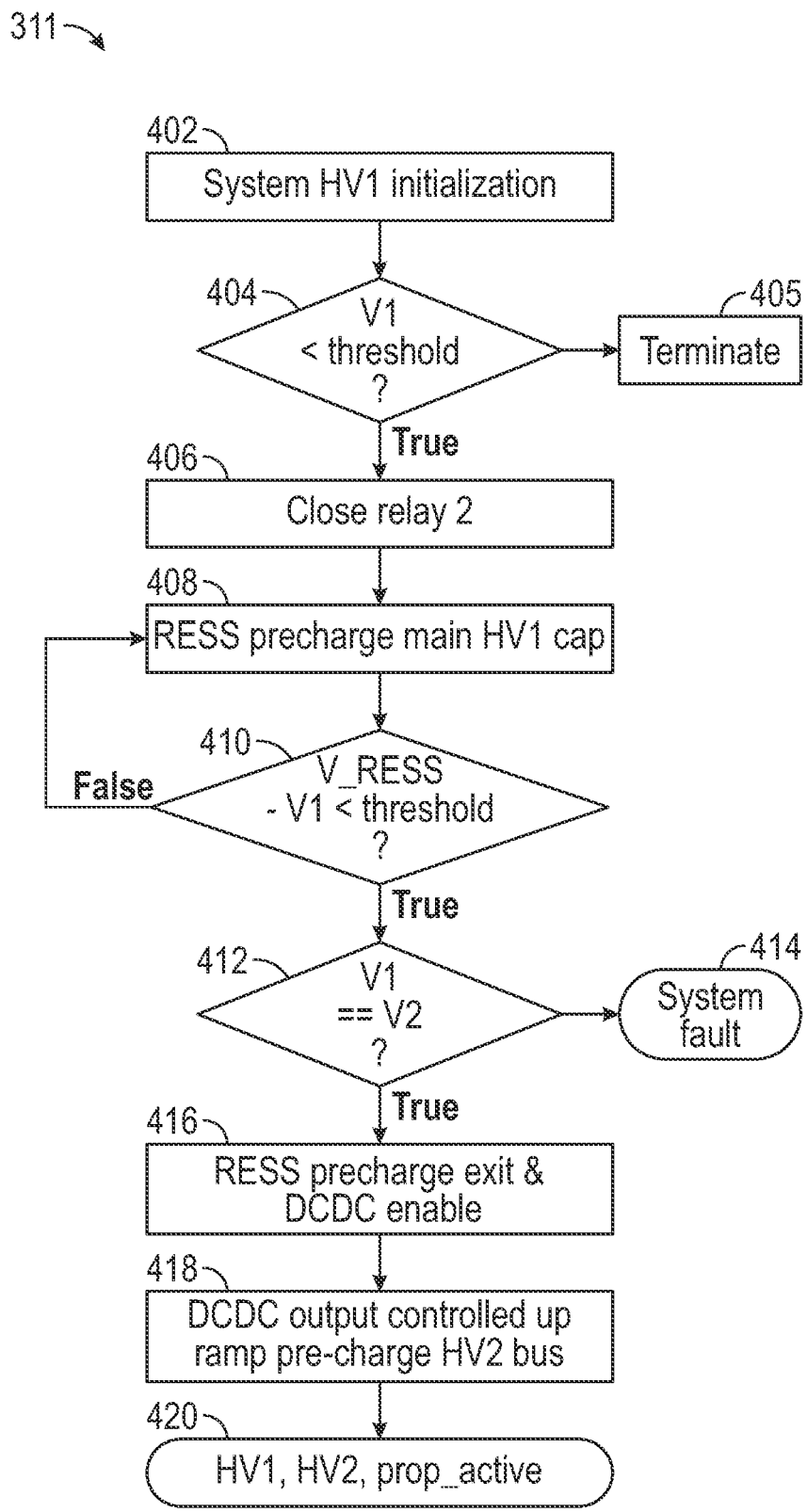
FIG. 4A is a flow diagram of a first high voltage mode power up method according to one or more embodiments described herein.

FIG. 4A is a flow diagram of a first high voltage mode power up method 311 according to one or more embodiments described herein. The method 311 generally includes performing an initialization, performing a relay status check, closing the relay 212, performing a capacitor precharge for the RESS 114, performing a system check, enabling the DC-DC converter 116, and regulating a ramp up voltage to a target level to charge an output of the DC-DC converter 116. The method 311 is now more particularly described. At block 402, an initialization occurs for the first high voltage mode. At block 404, it is determined whether the voltage at node 221 is less than a threshold. If not, the method 311 terminates at block 405. If so, the method 311 proceeds to block 406 where the relay 212 is closed. At block 408, the RESS 114 performs a capacitor precharge. At block 410, it is determined whether a voltage of the RESS minus the voltage measured at the node 221 is less than a threshold. If not, the precharging at block 408 continues until the RESS minus the voltage measured at the node 221 is less than the threshold, and the method 311 advances to block 412. At block 412, it is determined whether the voltage at the node 221 is equal to the voltage at the node 222. If not, a system fault is determined to have occurred at block 414. If the voltage at the node 221 is equal to the voltage at the node 222, the RESS precharge ends and the DC-DC converter 116 is enabled at block 416. At block 418, an output of the DC-DC converter 116 is controlled to ramp up a precharge across the auxiliary device 124 to a target level to charge the output of the DC-DC converter 116. At block 420, the electric motor 120 and the auxiliary device 124 are both provided with electric power at the appropriate voltage level.

Figure 4B:
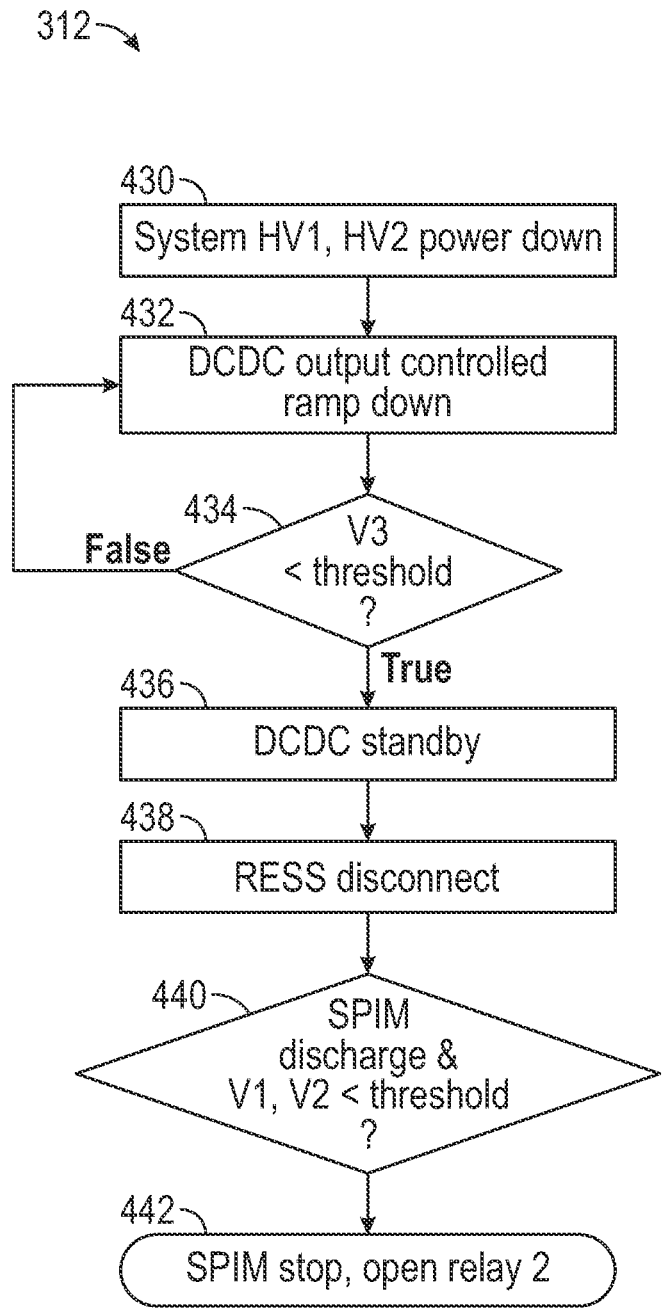
FIG. 4B is a flow diagram of a power down method for a first high voltage mode according to one or more embodiments described herein.

FIG. 4B is a flow diagram of a power down method 312 for a first high voltage mode according to one or more embodiments described herein. The method 312 generally includes performing a ramp down for the DC-DC converter 116, discharging a system capacitor and putting the DC-DC converter 116 in a standby mode, electrically disconnecting the RESS 114, discharging a capacitor, stopping a single power inverter module (SPIM), and opening the relay 212. The method 312 is now more particularly described. At block 430, system power down begins. At block 432, the output of the DC-DC converter 116 is ramped down. It is then determined at block 434 whether a voltage at the node 233 is below a threshold. If not, the ramp down continues at block 432 until the voltage at the node 233 is below the threshold. The method 312 then continues to block 436 where the DC-DC converter 116 is put in a standby mode. At block 438, the RESS 114 is electrically disconnected from the DC-DC converter 116. At block 440, a capacitor discharge occurs until a threshold voltage is reached as measured at the nodes 221, 222. At block 442, the relay 212 is opened.

Figure 4C:
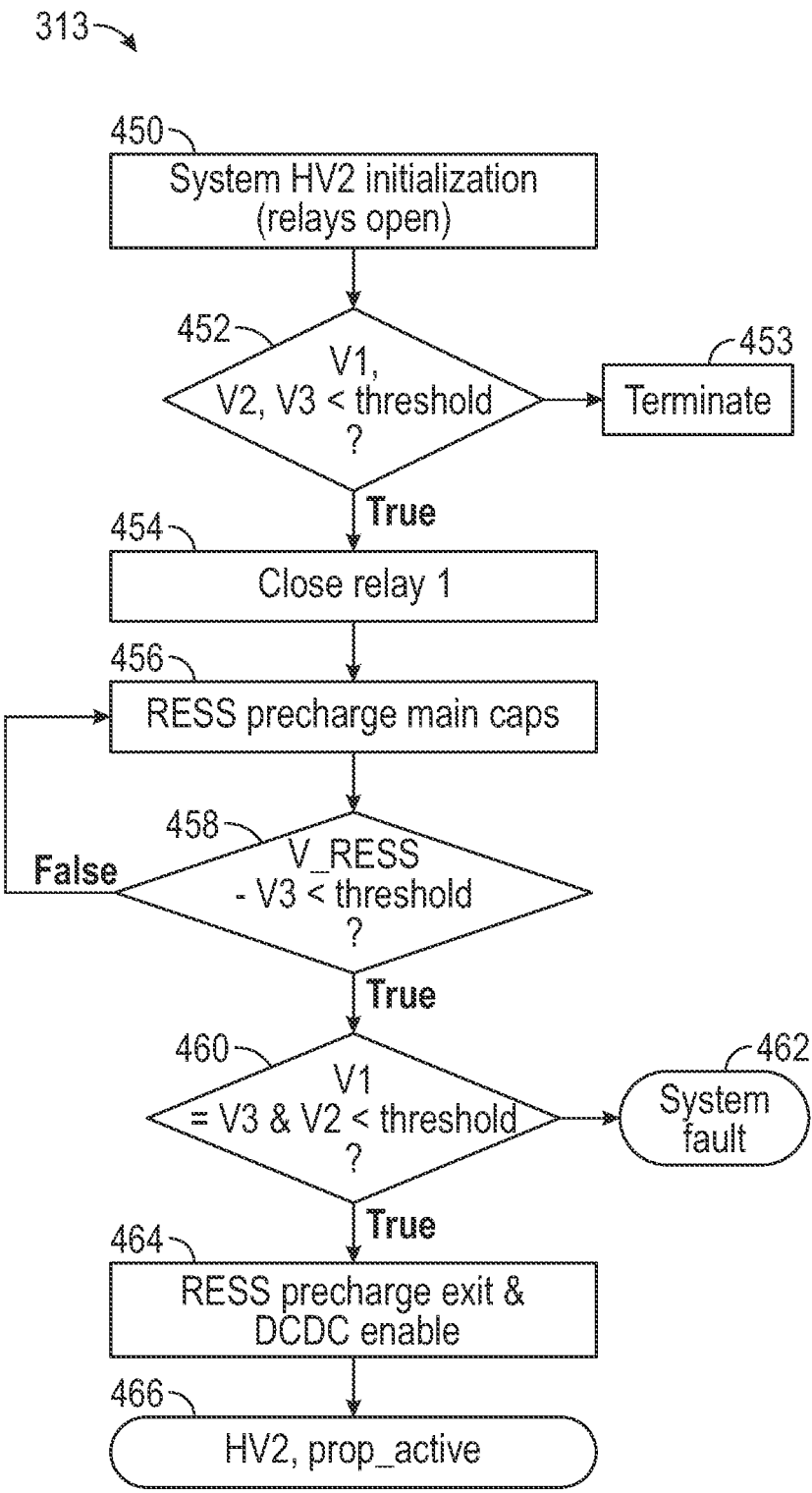
FIG. 4C is a flow diagram of a power up method for a second high voltage mode according to one or more embodiments described herein.

FIG. 4C is a flow diagram of a power up method 313 for a second high voltage mode according to one or more embodiments described herein. The method 313 generally includes performing an initialization, performing a relay status check, closing the relay 211 for bypass, performing a capacitor precharge for the RESS 114, and performing a system check. The method 313 is now more particularly described. At block 450, a system initialization occurs, and the relays 211, 212 are opened. At block 452, it is determined whether the voltages at the nodes 221-223 are below a threshold. If not, the method 313 terminates at block 453. If the voltages at the nodes 221-223 are below the threshold, the relay 211 is closed at block 454. At block 456, the RESS 114 performs a capacitor precharge until the voltage of the RESS 114 minus the voltage at the node 223 is below a threshold as determined at block 458. Once the voltage of the RESS 114 minus the voltage at the node 223 is below the threshold, the method 313 proceeds to block 460 where it is determined whether the voltage at the node 221 is equal to the voltage at the node 223 and the voltage at the node 222 is below a threshold. If either of the conditions at block 460 are false, a system fault is considered to have occurred at block 462. Otherwise, the method 313 advances to block 464 where the RESS precharge ends and the DC-DC converter 116 is enabled. At block 466, the electric motor 120 and the auxiliary device 124 are both provided with electric power at the appropriate voltage level.

Figure 4D:
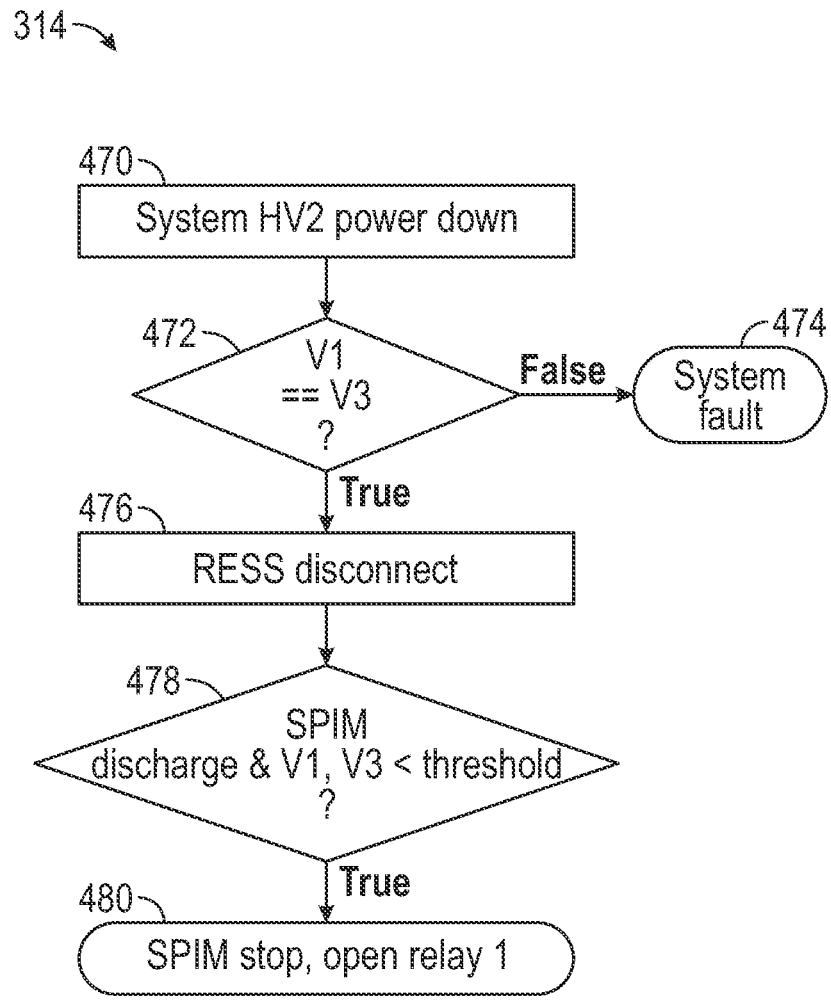
FIG. 4D is a flow diagram of a power down method for a second high voltage mode according to one or more embodiments described herein.

FIG. 4D is a flow diagram of a power down method 314 for a second high voltage mode according to one or more embodiments described herein. The method 314 generally includes performing status check of the relay 211, electrically disconnecting the RESS 114, discharging a capacitor, stopping the SPIM, and opening the relay 211. The method 314 is now more particularly described. At block 470, system power down begins. At block 472, it is determined whether the voltage at the node 221 equals the voltage at the node 223. If not, a system fault is considered to have occurred at block 474. If the voltage at the node 221 equals the voltage at the node 223, the RESS 114 is electrically disconnected at block 476. At block 478, it is determined whether a capacitor discharge has completed and whether the voltages as measured at the nodes 221, 223 are less than a threshold. Once the conditions of block 478 are satisfied, the relay 211 is opened at block 480.

Figure 5:
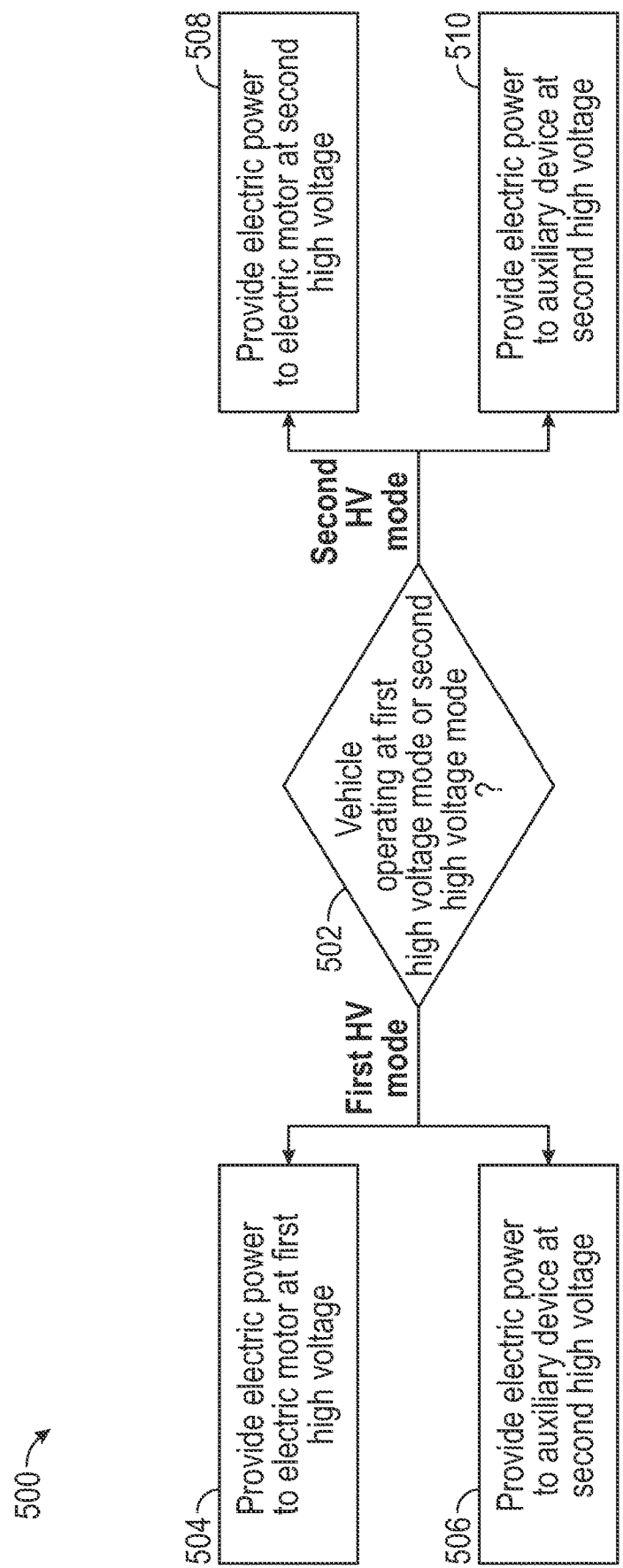
FIG. 5 is a block diagram of a method for high voltage switching for an electric vehicle according to one or more embodiments described herein.

FIG. 5 is a block diagram of a method 500 for high voltage switching for an electric vehicle according to one or more embodiments described herein. The method 500 can be performed by any suitable system or device such as the controller 110 of FIG. 1, the processing system 600 of FIG. 6, or any other suitable processing system and/or processing device (e.g., a processor). The method 500 is now described with reference to one or more aspects of FIGS. 1 and 2 but is not so limited.

At decision block 502, the controller 110 determines whether the vehicle 100 is operating in a first high voltage mode or a second high voltage mode.

If at decision block 502 it is determined that the vehicle 100 is operating in the first high voltage mode, the method 500 proceeds to block 504 and block 506. At block 504, electric power is provided to the electric motor 120 at a first high voltage (e.g., substantially 800 volts). At block 506, electric power is provided to the auxiliary device 124 at a second high voltage (e.g., substantially 400 volts). In examples, providing electric power to the auxiliary device 124 at the second high voltage (block 506) includes engaging the DC-DC converter 116, such as by closing the relay 212.

If at decision block 502 it is determined that the vehicle 100 is operating in the second high voltage mode, the method 500 proceeds to block 508 and block 510. At block 508, electric power is provided to the electric motor 120 at the second high voltage (e.g., substantially 400 volts). At block 510, electric power is provided to the auxiliary device 124 at the second high voltage (e.g., substantially 400 volts). In examples, providing electric power to the auxiliary device 124 at the second high voltage (block 510) includes disengaging the DC-DC converter 116, such as by opening the relay 212, and engaging a DC-DC converter bypass, such as by closing the relay 211.

According to one or more embodiments described herein, the electric power is provided by the rechargeable energy storage system 114 disposed within the vehicle 100.

Additional processes also may be included, and it should be understood that the process depicted in FIG. 5 represents an illustration and that other processes may be added or existing processes may be removed, modified, or rearranged without departing from the scope and spirit of the present disclosure.

Figure 6:
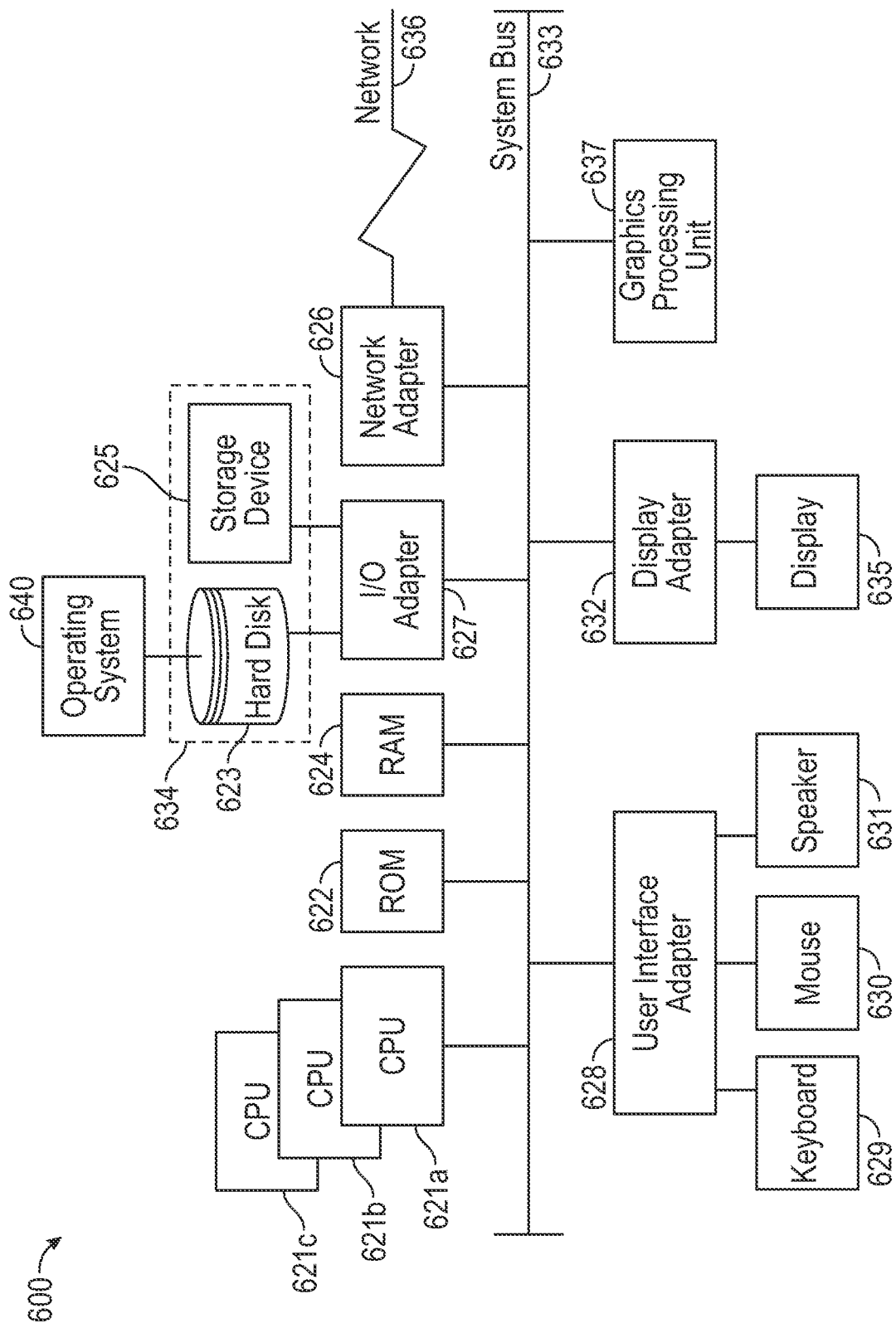
FIG. 6 is a block diagram of a processing system for implementing the techniques described herein according to an exemplary embodiment.

It is understood that one or more embodiments described herein is capable of being implemented in conjunction with any other type of computing environment now known or later developed. For example, FIG. 6 depicts a block diagram of a processing system 600 for implementing the techniques described herein. In examples, processing system 600 has one or more central processing units ("processors") or "processing resources") 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of processing system 600.

Further depicted are an input/output (I/O) adapter 627 and a network adapter 626 coupled to system bus 633. I/O adapter 627 may be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to system bus 633 by display adapter 632, which may include a graphics adapter to improve the performance of graphics intensive applications and a video controller. In one aspect of the present disclosure, adapters 626, 627, and/or 632 may be connected to one or more I/O busses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 may be interconnected to system bus 633 via user interface adapter 628, which may include, for example, a Super I/O chip integrating multiple device adapters into a single integrated circuit.

In some aspects of the present disclosure, processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 to coordinate the functions of the various components shown in processing system 600.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A method comprising:
   determining whether a vehicle is operating in a first high voltage mode or a second high voltage mode;
   responsive to determining that the vehicle is operating in the first high voltage mode, providing electric power to an electric motor at a first high voltage and providing electric power to an auxiliary device at a second high voltage that is different than the first high voltage; and
   responsive to determining that the vehicle is operating in the second high voltage mode, providing electric power to the electric motor at the second high voltage and providing electric power to the auxiliary device at the second high voltage.

2. The method of claim 1, wherein providing electric power to the auxiliary device at the second high voltage comprises engaging a direct current to direct current (DC-DC) converter.

3. The method of claim 2, wherein engaging the DC-DC converter comprises closing a first relay at an input of the DC-DC converter.

4. The method of claim 2, wherein providing electric power to the auxiliary device at the second high voltage comprises disengaging the DC-DC converter and engaging a DC-DC converter bypass.

5. The method of claim 4, wherein disengaging the DC-DC converter comprises opening a first relay at an input of the DC-DC converter and closing a second relay associated with the DC-DC converter bypass.

6. The method of claim 1, wherein the electric power is provided by a rechargeable energy storage system disposed within the vehicle.

7. The method of claim 1, wherein the first high voltage is substantially 800 volts and wherein the second high voltage is substantially 400 volts.

8. A vehicle comprising:
   an electric motor;
   an auxiliary device; and
   a controller to:
      determine whether the vehicle is operating in a first high voltage mode or a second high voltage mode;
      responsive to determining that the vehicle is operating in the first high voltage mode, cause electric power to be provided to the electric motor at a first high voltage and cause electric power to be provided to the auxiliary device at a second high voltage that is different than the first high voltage; and
      responsive to determining that the vehicle is operating in the second high voltage mode, cause electric power to be provided to the electric motor at the second high voltage and cause electric power to be provided to the auxiliary device at the second high voltage.

9. The vehicle of claim 8, wherein causing electric power to be provided to the auxiliary device at the second high voltage comprises causing a direct current to direct current (DC-DC) converter to be engaged.

10. The vehicle of claim 9, wherein causing the DC-DC converter to be engaged comprises causing a first relay at an input of the DC-DC converter to be closed.

11. The vehicle of claim 9, wherein causing electric power to be provided to the auxiliary device at the second high voltage comprises causing the DC-DC converter to be disengaged and causing a DC-DC converter bypass to be engaged.

12. The vehicle of claim 11, wherein causing the DC-DC converter to be disengaged comprises causing a first relay at an input of the DC-DC converter to be opened and causing a second relay associated with the DC-DC converter bypass to be closed.

13. The vehicle of claim 8, wherein the electric power is provided by a rechargeable energy storage system disposed within the vehicle.

14. The vehicle of claim 8, wherein the first high voltage is substantially 800 volts and wherein the second high voltage is substantially 400 volts.

15. A system comprising:
   a memory comprising computer readable instructions; and
   a processing device for executing the computer readable instructions, the computer readable instructions controlling the processing device to perform operations comprising:
      determining whether a vehicle is operating in a first high voltage mode or a second high voltage mode;
      responsive to determining that the vehicle is operating in the first high voltage mode, causing electric power to be provided to an electric motor at a first high voltage and causing electric power to be provided to an auxiliary device at a second high voltage that is different than the first high voltage; and responsive to determining that the vehicle is operating in the second high voltage mode, causing electric power to be provided to the electric motor at the second high voltage and causing electric power to be provided to the auxiliary device at the second high voltage.

16. The system of claim 15, wherein causing electric power to be provided to the auxiliary device at the second high voltage comprises causing a direct current to direct current (DC-DC) converter to be engaged.

17. The system of claim 16, wherein causing the DC-DC converter to be engaged comprises causing a first relay at an input of the DC-DC converter to be closed.

18. The system of claim 16, wherein causing electric power to be provided to the auxiliary device at the second high voltage comprises causing the DC-DC converter to be disengaged and causing a DC-DC converter bypass to be engaged.

19. The system of claim 18, wherein causing the DC-DC converter to be engaged comprises causing a first relay at an input of the DC-DC converter to be opened and causing a second relay associated with the DC-DC converter bypass to be closed.

20. The system of claim 15, wherein the electric power is provided by a rechargeable energy storage system disposed within the vehicle.

* * * * *